United States Patent
Black et al.

(10) Patent No.: US 9,241,339 B2
(45) Date of Patent: Jan. 19, 2016

(54) METHODS AND APPARATUS FOR EMPHASIZING FREQUENCY BLOCKS CONTAINING PRIORITY DATA

(71) Applicant: MOTOROLA MOBILITY LLC, Libertyville, IL (US)

(72) Inventors: Gregory R. Black, Vernon Hills, IL (US); William P. Alberth, Jr., Prairie Grove, IL (US); Armin W. Klomsdorf, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 216 days.

(21) Appl. No.: 13/735,595

(22) Filed: Jan. 7, 2013

(65) Prior Publication Data
US 2014/0192725 A1    Jul. 10, 2014

(51) Int. Cl.
*H04B 7/00* (2006.01)
*H04W 72/10* (2009.01)
*H04L 25/02* (2006.01)
*H04L 25/03* (2006.01)
*H04L 27/01* (2006.01)

(52) U.S. Cl.
CPC ............ *H04W 72/10* (2013.01); *H04L 25/028* (2013.01); *H04L 25/03* (2013.01); *H04L 25/03343* (2013.01); *H04L 25/03828* (2013.01); *H04L 27/01* (2013.01); *H04L 2025/03471* (2013.01)

(58) Field of Classification Search
CPC .............................. H04W 52/38; H04W 52/52
USPC .......... 370/310, 329, 343, 431, 437, 464, 465
See application file for complete search history.

(56) References Cited

U.S. PATENT DOCUMENTS

| | | | |
|---|---|---|---|
| 3,590,385 A * | 6/1971 | Sabo et al. | 455/123 |
| 4,194,154 A | 3/1980 | Kahn | |
| 5,483,688 A * | 1/1996 | English et al. | 455/184.1 |
| 6,415,001 B1 * | 7/2002 | Li et al. | 375/259 |
| 6,587,510 B1 * | 7/2003 | Minami et al. | 375/285 |

(Continued)

FOREIGN PATENT DOCUMENTS

EP    0570216 A2    11/1993

OTHER PUBLICATIONS

S Raju et al: "Improvement in Data Transmission Efficiency in Communication Systems Using Scattering Compensation Techniques", Progress in Electromagnetics Research C, Jan. 1, 2010, pp. 237-251, Retrieved from the Internet: URL:http://www.jpier.org/pierc12/20.09121608.pdf, retireved on Apr. 8, 2014.

(Continued)

*Primary Examiner* — Dmitry H Levitan
(74) *Attorney, Agent, or Firm* — Lerner, David, Littenberg, Krumholz & Mentlik, LLP

(57) ABSTRACT

A method is performed in an electronic device for emphasizing frequency blocks containing priority data. The method includes: determining to communicate data in a plurality of allocated frequency blocks; identifying a first subset of the plurality of allocated frequency blocks that contain data having a higher priority than data in a second subset of the plurality of allocated frequency blocks; and emphasizing, during data communication, the first subset of the plurality of allocated frequency blocks, which contain the data having the higher priority, over the second subset of the plurality of allocated frequency blocks.

16 Claims, 2 Drawing Sheets

(56) References Cited

U.S. PATENT DOCUMENTS

| | | | |
|---|---|---|---|
| 7,411,930 B2* | 8/2008 | Montojo et al. | 370/335 |
| 7,606,549 B2* | 10/2009 | Suominen | 455/302 |
| 8,472,967 B2* | 6/2013 | Ghosh et al. | 455/452.1 |
| 2003/0083836 A1* | 5/2003 | Spencer | 702/107 |
| 2005/0046592 A1 | 3/2005 | Cooper et al. | |
| 2011/0038271 A1* | 2/2011 | Shin et al. | 370/252 |
| 2011/0092219 A1* | 4/2011 | Damnjanovic et al. | 455/450 |
| 2011/0171989 A1 | 7/2011 | Kim et al. | |
| 2012/0087657 A1 | 4/2012 | Jander et al. | |
| 2013/0331042 A1* | 12/2013 | See et al. | 455/77 |

OTHER PUBLICATIONS

J. Sewter et al.: "A 3-Tap FIR Filter With Cascaded distributed Tap Amplifiers for Equalization Up to 40 Gb/s in 0.18-<tex>$mu$</tex>m CMOS", IEEE Journal of Solid-State Circuits, vol. 41, No. 8, Aug. 1, 2006, pp. 1919-1929.

Patent Cooperation Treaty, International Search Report and Written Opinion of the International Searching Authority for International Application No. PCT/US2013/078194, Apr. 22, 2014, 14 pages.

\* cited by examiner

200 # METHODS AND APPARATUS FOR EMPHASIZING FREQUENCY BLOCKS CONTAINING PRIORITY DATA

FIELD OF THE DISCLOSURE

The present disclosure relates generally to wireless communications and more particularly to methods and apparatus for emphasizing frequency blocks containing priority data.

BACKGROUND

A trend in electronic device design, such as mobile device design, is increasing constraints on physical space for antennas. This leads to a narrow antenna bandwidth. In some electronic devices, such as electronic devices implementing Long Term Evolution (LTE) standards, this causes amplitude variation across allocated Orthogonal Frequency-Division Multiple Access (OFDMA) resource blocks. However, some allocated resource blocks contain more important information than other allocated resource blocks during data communications, such as allocated resource blocks that contain certain control data or certain higher priority application data. Depending on the location of the more important information within the spectrum of the allocated resource blocks, the above-mentioned amplitude variation could cause a weak or improper reception of this important information.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
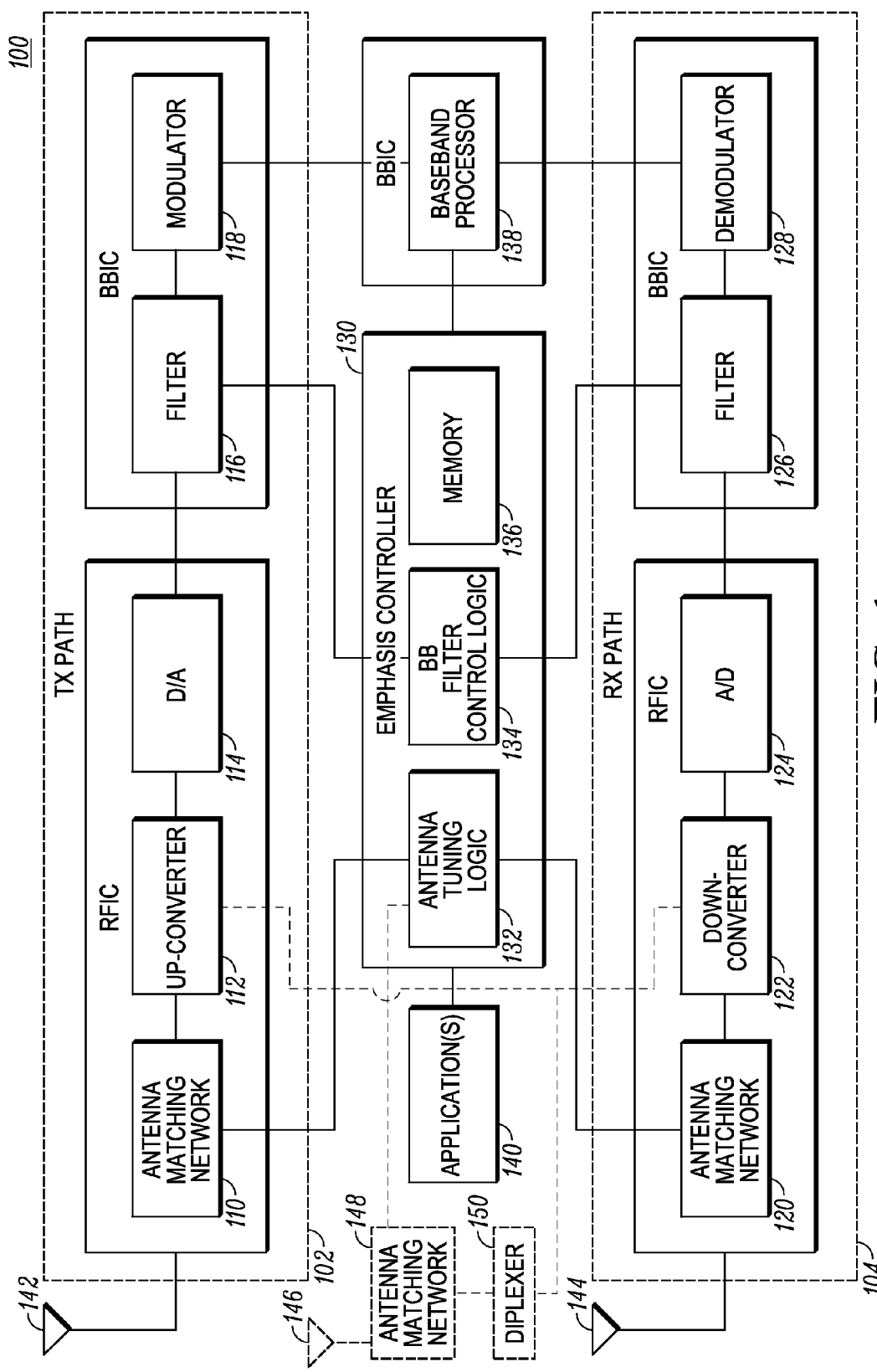
FIG. 1 is a block diagram of an electronic device configured for emphasizing frequency blocks containing priority data in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, an electronic device identifies a subset of frequency blocks of a plurality of frequency blocks, such as a plurality of OFDMA resource blocks, which contain higher priority or more important data than the data contained in other frequency blocks in the plurality. As described below, the electronic device emphasizes the frequency blocks containing the higher priority data over the other frequency blocks. The emphasizing can be done in a transceiver front end and/or in baseband filtering. In this manner, more important data can be transmitted and properly received with a higher signal quality and using fewer or no retransmissions.

For example, in one embodiment, a method is performed in an electronic device for emphasizing frequency blocks containing priority data. The method includes: determining to communicate data in a plurality of allocated frequency blocks; identifying a first subset of the plurality of allocated frequency blocks that contain data having a higher priority than data in a second subset of the plurality of allocated frequency blocks; and emphasizing, during data communication, the first subset of the plurality of allocated frequency blocks, which contain the data having the higher priority, over the second subset of the plurality of allocated frequency blocks.

In accordance with another embodiment is an electronic device configured for emphasizing frequency blocks containing priority data. The electronic device includes a processor that is configured to: determine that data is scheduled for communication in a plurality of allocated frequency blocks; identify a first subset of the plurality of allocated frequency blocks that contain data having a higher priority than data in a second subset of the plurality of allocated frequency blocks; and emphasize the first subset of the plurality of allocated frequency blocks, which contain the data having the higher priority, over the second subset of the plurality of allocated frequency blocks. The electronic device further includes at least one antenna coupled to the processor and configured to communicate the data.

For example, the electronic device includes a baseband integrated circuit having a filter coupled to the processor, wherein the processor is configured to control the filter to increase an amplitude of the first subset of the plurality of allocated frequency blocks, which contain the data having the higher priority, relative to an amplitude of the second subset of the plurality of allocated frequency blocks. In another example implementation, the electronic device includes a transceiver front end having an antenna matching network coupled between the processor and the at least one antenna, wherein the processor is configured to tune the antenna matching network to center an output frequency response, of the at least one antenna, on a center frequency within the first subset of the plurality of allocated frequency blocks, which contain the data having the higher priority. The antenna matching network can be located in at least one of a transmit path or a receive path, meaning the transmit path, the receive path or both.

In accordance with another embodiment is a method, performed in an electronic device, for emphasizing resource blocks containing priority data. This method includes: determining to communicate data in a plurality of allocated Orthogonal Frequency-Division Multiple Access resource blocks; identifying a first subset of the plurality of allocated resource blocks that contain data having a higher priority than data in a second subset of the plurality of allocated resource blocks; and emphasizing, during data communication, the first subset of the plurality of allocated resource blocks, which contain the data having the higher priority, over the second subset of the plurality of allocated resource blocks.

In one embodiment, the emphasizing comprises adjusting a baseband filter to increase an amplitude of the first subset of the plurality of allocated frequency blocks, which contain the data having the higher priority, relative to an amplitude of the second subset of the plurality of allocated frequency blocks. In another embodiment, the emphasizing comprises tuning an antenna matching network to center an output frequency response, of at least one antenna of the electronic device, on a center frequency within the first subset of the plurality of allocated frequency blocks, which contain the data having the higher priority.

Referring now to the drawings, and in particular FIG. 1, an electronic device configured for emphasizing frequency blocks containing priority data, in accordance with some embodiments, is shown and indicated generally at 100. In one illustrative implementation, the electronic device 100 is a mobile wireless communication device that sends uplink signals to a base station such as an eNodeB. Such mobile devices include, but are not limited to, a radiotelephone, a cellular telephone, a smart phone, a tablet computer, a personal digital assistant, a gaming console, an electronic book reader, or any other type of electronic device capable of uplink communication of data to a base station. However, in an alternative implementation scenario, the electronic device 100 is an infrastructure device such as a base station that is capable of downlink communication of data to a wireless communication device.

Moreover, in one particular embodiment, the electronic device 100 operates in conformance with $3^{rd}$ Generation Partnership Project (3GPP) standards (including Long Term Evolution (LTE), LTE advanced, High Speed Packet Access+ (HSPA), and the like), WiMax, etc., and related protocols such as OFDMA, Orthogonal Frequency-Division Multiplexing (OFDM), Single Carrier Frequency-Division Multiple Access (SC-FDMA), etc. Those skilled in the art, however, will recognize and appreciate that the specifics of this example are merely illustrative of some embodiments and that the teachings set forth herein are applicable in a variety of alternative settings. For example, since the teachings described do not depend on the type of electronic device or wireless communication standards and/or protocols used, they can be applied to any type of electronic device or wireless communication standards and/or protocols, although a mobile device implementing 3GPP standards and related protocols is described herein. As such, other alternative implementations of using different types of electronic devices or wireless communication standards and/or protocols are contemplated and are within the scope of the various teachings described.

The electronic device 100, in the embodiment shown, includes a transmit path 102 coupled to an antenna 142 and a receive path 104 coupled to an antenna 144. In one illustrative implementation, the antennas 142 and 144 are antennas that are tunable to operate within different frequency bands, which are ranges of frequencies from which frequency blocks can be allocated or assigned. In other words, the antennas are tunable such that an output frequency response of the antenna, as defined by the frequency range of an output signal from the antenna, falls within a given frequency band. The particular frequency bands, or simply bands, over which the antenna operates depend at least in part on the wireless communication protocols implemented by the electronic device 100. Examples frequency bands include, but are not limited to, LTE receive (Rx) and transmit (Tx) bands, Evolved-Data Optimized/Global System for Mobile Communications (EVDO/GSM) Rx and Tx bands, GSM Rx and Tx bands, and Universal Mobile Telecommunications System (UMTS) Rx and Tx bands, to name a few. In one particular embodiment, the antennas 142 and 144 each have a bandwidth of operation that is narrow as compared to the bandwidth of the one of more frequency bands in which the antennas are capable of operating.

The electronic device 100 shown in FIG. 1 comprises a simplex antenna arrangement, wherein the transmit path 102 and receive path 104 couple to separate antennas 142 and 144, respectively. Alternative antenna arrangements can be employed, such as a duplex antenna arrangement, wherein the transmit path 102 and receive path 104 share a single antenna 146 and antenna matching network 148. In this case, a combining circuit such as a duplex filter (not shown), diplexer 150, or circulator (not shown) combines transmit and receive signals from the transmit path 102 and receive path 104 to feed the single antenna 146 and antenna matching network 148.

The electronic device 100 includes a baseband integrated circuit (BBIC) and a radio frequency integrated circuit (RFIC) that control wireless communications in the electronic device. For example, the BBIC includes a baseband processor 138 having data processing hardware, a memory (e.g., random access memory (RAM) not shown) and firmware or software used to configure, e.g., program, the baseband processor 138 to perform a number of radio control functions that require an antenna for data communications. The functions include, but are not limited to: encoding and decoding digital data; generating or parsing out certain control data such as acknowledges (ACKs), not-acknowledges (NACKs), channel quality indicators (CQIs) and the like; modulation and demodulation; etc.

In an embodiment, modulation and demodulation are performed using OFDMA techniques as an example, but not by way of limitation. The modulation function is logically illustrated in FIG. 1 as the baseband processor 138 being coupled to a modulator 118, which is located in the BBIC and is part of the transmit path 102. Similarly, the demodulation function is logically illustrated in FIG. 1 as the baseband processor 138 being coupled to a demodulator 128, which is located in the BBIC and is part of the receive path 104.

The transmit path 102 further includes a digital filter network 116 in the BBIC, which is coupled between the modulator 118 and a transceiver front end, particularly a transmitter front end, on the RFIC. The transmitter front end comprises a digital-to-analog (D/A) converter 114, an up-converter 112, and an antenna matching network 110, coupled as shown. The receive path 104 further includes a digital filter network 126 in the BBIC, which is coupled between the demodulator 128 and the transceiver front end, particularly a receiver front end, on the RFIC. The receiver front end comprises an analog-to-digital (A/D) converter 124, a down-converter 122, and an antenna matching network 120, coupled as shown.

In an embodiment, each digital filter 116, 126 comprises one or more amplification elements that are tunable to amplify or enhance certain select frequencies or frequency blocks over others and/or to attenuate certain frequencies or frequency blocks relative to others. Accordingly, it can be said that the digital filters 116, 126 are configured to increase an amplitude of certain select frequency blocks relative to an amplitude of other frequency blocks, wherein the amplitude is a measurement of the strength of the signal at a particular frequency block or set of frequency blocks. Each digital filter 116, 126 may further comprise one or more delay elements to implement the digital processing within the filter. The ability to change or tune how the amplification and/or delay elements of a digital filter are applied to a digital signal is referred to herein as digital tuning. In one embodiment, the electronic device 100 is configured to perform digital tuning using the filter 116 and/or 126 to equalize the frequency response of a signal to a substantially uniform frequency response. This, for example, enables the electronic device 100 to compensate or correct for distortion in the transmission medium and/or to comply with flatness requirements of one or more wireless communication standards, such as 3GPP standards. Digital tuning is also used, in accordance with embodiments of the present teachings, for emphasizing frequency blocks having higher priority data over other frequency blocks.

In an embodiment, each antenna matching networks 110, 120 comprise one or more tunable electronic components, such as one or more capacitors and/or inductors, having electrical characteristics that can be adjusted or tuned. For example, the components of an antenna matching network are adjusted in order to tune or change the output frequency response of an antenna to which the antenna matching network is coupled. Such tuning, which occurs in the transceiver front end where analog signals are processed, is referred to herein as analog tuning. In general an antenna matching network is used to center the antenna output frequency response on a particular frequency, called a center frequency. Accordingly, frequencies of the antenna output frequency response that are near the center frequency are transmitted at the highest power, and the transmit power decreases as the frequencies of the antenna output frequency response get farther from the center frequency and approach the edge of the bandwidth of the antenna. In one example implementation, the default analog tuning of each antenna matching network results in centering the corresponding antenna output frequency response on a frequency at the center of a current or and Tx frequency band of operation. Analog tuning is also used, in accordance with embodiments of the present teachings, for emphasizing frequency blocks having higher priority data over other frequency blocks.

During a transmit operation of the electronic device 100, the baseband processor 138 receives payload or application data, for instance, audio (e.g., voice) data from a microphone, video data from a recording device, or other data from one or more applications 140 in the electronic device 100. The baseband processor 138 can also generate control data used for administering various aspects of a communication session, for example, between the electronic device 100 and an eNodeB (not shown). Data, as used herein, includes any information passed between two devices. The baseband processor 138 supplies a digital information signal containing the data, also referred herein as a data stream, to the modulator 118.

The modulator 118 modulates the data onto a plurality of allocated frequency blocks. A frequency block is defined as an RF resource unit that is used to communicate the data over-the-air to another device; and a frequency block is characterized, at least in one aspect, by a frequency component, and may be further characterized in other aspects, for instance by a time component. A frequency block is, thus, at a minimum characterized by an associated bandwidth measured in units of frequency such as Hz. A plurality of allocated frequency blocks is also associated with a composite bandwidth, which is referred to herein as a spectrum of the frequency block, for transmitting the data. Similarly, the composite bandwidth of any range of frequencies, including a given frequency band, is referred to herein as the spectrum of that range of frequencies. In an embodiment, the plurality of allocated frequency blocks comprises a plurality of allocated OFDMA resource blocks, wherein each resource block has a bandwidth of 180 kHz and is 0.5 ms in duration. A modulated data signal from the modulator 118 is then digitally processed in the filter 116 to reduce or enhance certain aspects of the signal, for example through delays or amplification imposed on certain portions of the signal. The filtered digital signal is converted to an analog signal in the transmitter front end and then radiated from the antenna 142.

During a receive operation, the reverse signal processing is performed. The antenna 144 receives (i.e., picks up) an analog signal having data, which is processed by components in the receive front end to convert the analog signal into a digital signal. This digital signal is digitally processed in the filter 126 and demodulated by the demodulator 128 to extract the data from the plurality of frequency blocks. The demodulated data is passed to the baseband processor 138, which decodes the demodulated data to enable other components in the device 100 to prepare the received data for storage and/or presentation to a user.

The electronic device 100 also includes an emphasis controller 130 in accordance with the present teachings, which, in one embodiment, is coupled to one or more applications 140 and the baseband processor 138. The emphasis controller 130 is also referred to herein, generally, as a processor. In one example implementation, the emphasis controller 130 is housed on the BBIC and may be integrated with the baseband processor 138 or may be a separate dedicated processor on the BBIC. In an alternative arrangement, the emphasis controller 130 comprises a separate IC from the BBIC.

The emphasis controller 130 comprises elements or components that are adapted to perform functionality in cooperation with other components of the electronic device 100 in order to implement the teachings herein, for example as described by reference to FIG. 2, for emphasizing frequency blocks containing priority data. More particularly, the emphasis controller 130 comprises antenna tuning logic 132 coupled to and configured to control the antenna matching networks 110 and 120 in the simplex antenna arrangement and the antenna matching network 148 in the duplex antenna arrangement. The emphasis controller 130 further comprises a baseband (BB) filter control logic 134 coupled to and configured to control the digital filters 116 and 126, in accordance with the present teachings. The emphasis controller 130 further includes memory 136 for storing various data and/or software and firmware used by the emphasis controller 130 for performing its functionality in accordance with the present teachings.

In general, as used herein, devices such as the electronic device 100 being "configured," "operative" or "adapted" means that such devices are implemented using one or more hardware devices such as memory devices, network interfaces such as transceivers, and/or processors that are operatively coupled, for example, as is shown in FIG. 1. The memory devices, network interfaces, and/or processors, when programmed (e.g., using software or firmware), form the means for these system elements to implement their desired functionality, for example, as illustrated by reference to a method 200 shown in FIG. 2.

Figure 2:
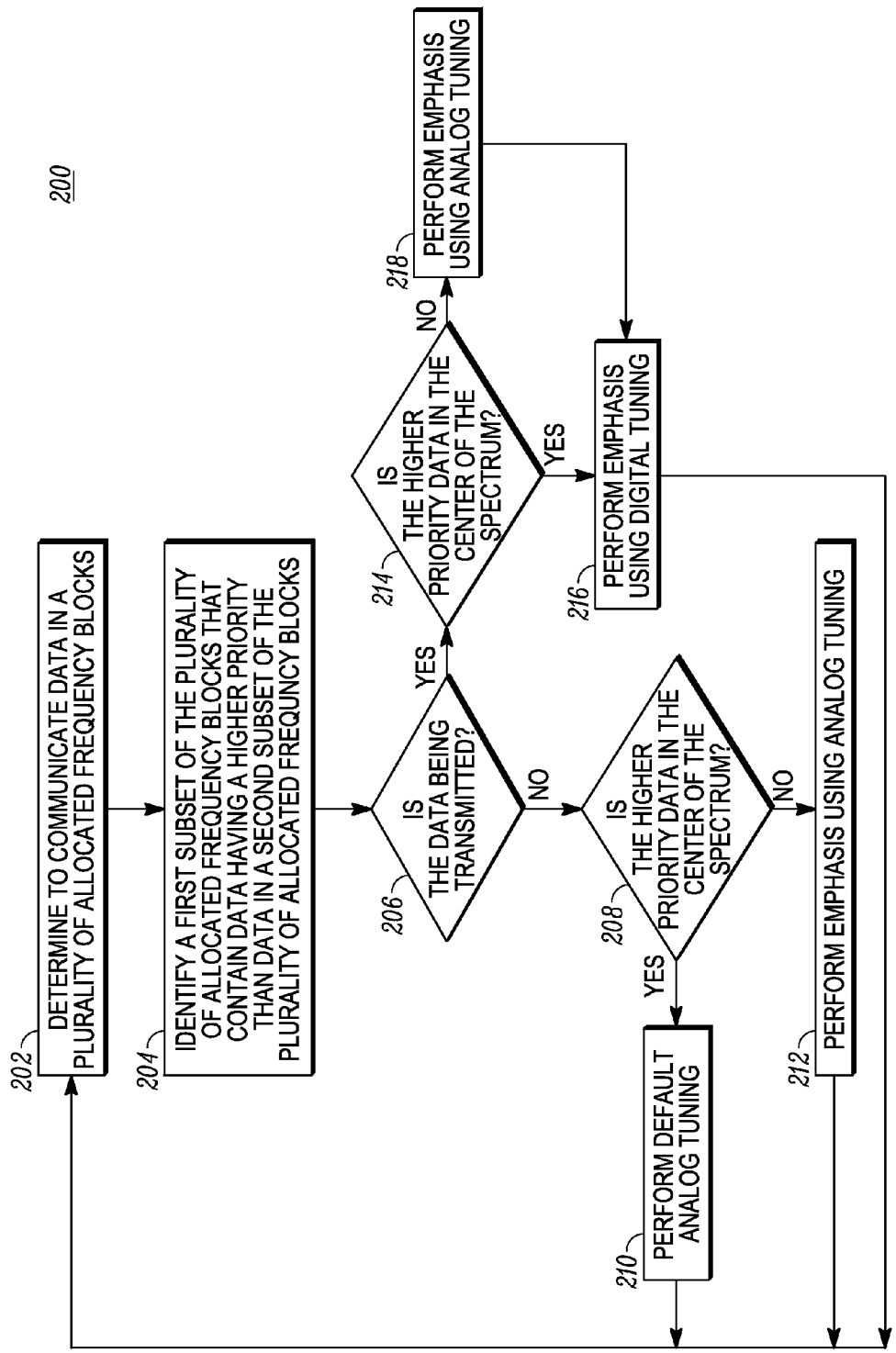
FIG. 2 is a flowchart of a method for emphasizing frequency blocks containing priority data in accordance with some embodiments.

Turning now to FIG. 2, a flowchart of a method for emphasizing frequency blocks containing priority data is shown and generally indicated at 200. Method 200 is performed by the components of an electronic device, such as the electronic device 100, which can be a wireless communication device or an infrastructure device. At 202, the electronic device 100 determines to communicate data in a plurality of, meaning multiple or more than one, allocated frequency blocks, which are assigned or set aside for use by the electronic device 100 for data communications. In one embodiment, the plurality of allocated frequency blocks comprises a plurality of, e.g., between 6 and 110, Orthogonal Frequency-Division Multiple Access resource blocks, which are allocated to the electronic device 100 by a scheduling function at an eNodeB; and the data to be communicated is application data, control data, or a combination of the two types of data.

For example, the baseband processor 138 has received data from one or more applications 140 (also referred herein as application data) such as voice data, and in one particular embodiment voice over LTE (VoLTE) data; or the baseband processor 138 has generated control data that is scheduled or set for communication, in this case transmission. Alternatively, the baseband processor 138 is expecting to receive control and/or application data from another device. Accordingly, it can be said in that instance that the expected data is scheduled for communication, in this case reception. Thus, communicating data means transmitting or receiving the data; and data communications, correspondingly, means data transmission or data reception.

At 204, the electronic device 100, for instance using the emphasis controller 130, identifies a first subset, meaning a portion or less than all, of the plurality of allocated frequency blocks that contain data having a higher priority than data in a second subset of the plurality of allocated frequency blocks. Priority implies a different level of relative importance between different data. For example, data from two different applications 140 might be assigned (e.g., by a system administrator such as through provisioning or programming of the electronic device 100) different relative levels of importance or priority.

In one illustrative implementation, VoLTE data may have a higher importance or priority that other types of application data such as video-on-demand or web browsing data or even voice data sent over another type of network. In another example implementation, control data is assigned a higher priority than at least some application data, and perhaps assigned the highest priority of any other data. Thus, depending on the data being communicated during any given time period, wherein method 200 is implemented for example, the data having the higher priority may comprises control data and/or higher priority application data such as voice data. In an embodiment, the emphasis controller 130 gets information from the baseband processor 138 about which allocated frequency blocks carry control data and gets information from the one or more applications 140 and/or the baseband processor 138 about which allocated frequency blocks contain higher priority application data, and uses this information to emphasize those allocated frequency blocks containing priority, higher priority, or critical data.

The first subset of the plurality of allocated frequency blocks containing the higher priority data is emphasized over the second subset of the plurality of allocated frequency blocks, in accordance with the remaining functional blocks 206-218 of method 200. Thus, emphasizing certain allocated frequency blocks over others is performed based on signal content and, more particularly, based on the relative importance or priority of the signal content. Emphasizing a given set of frequency blocks is defined as the use of signal processing to enhance, increase or boost the level, power, weight, or strength of some components of a signal, such as select frequency blocks, relative to other components of the signal.

In an embodiment, emphasis can be performed in the transmit path, e.g., the transmit path 102, wherein the first subset of the plurality of allocated frequency blocks, which contain the data having the higher priority, is emphasized during a transmission of the data. For instance, the first subset of the plurality of allocated frequency blocks, which contain the data having the higher priority, is emphasized during an uplink transmission of the data to a base station. In another embodiment, emphasis can be performed in the receive path, e.g., the receive path 104, wherein the first subset of the plurality of allocated frequency blocks, which contain the data having the higher priority, is emphasized during a reception of the data. In accordance with yet a further embodiment, the manner of emphasizing the selected frequency blocks is different based on whether the data is being transmitted or received, as determined at 206. In a duplex antenna arrangement, emphasis can be performed in a shared transmit and receive path using an antenna matching network, e.g., 148, for tuning an antenna, e.g., 146, which is used in both the transmit and receive operations. In this case, emphasis can be performed on either the transmit frequency blocks or the receive frequency blocks, depending on whichever has the higher priority data. In this case, at block 206, it is determined whether the higher priority data is being transmitted.

When the (higher priority) data is being transmitted, the emphasis controller 130 determines at 214 whether the higher priority data is carried within frequency blocks that are located at or near the center of the Tx frequency band spectrum. Where the higher priority data is carried within frequency blocks that are located at or near the center of the Tx frequency band spectrum, the default analog tuning (e.g., that centers the antenna output frequency response at the center of the frequency band of operation) would already favor, via a higher transmit power, those frequency blocks. Accordingly, to further favor the frequency blocks having the higher priority data, the emphasizing is performed, at 216, using digital tuning.

More particularly, the digital tuning comprises adjusting the baseband filter 116 to increase an amplitude of the first subset of the plurality of allocated frequency blocks, which contain the data having the higher priority, relative to an amplitude of the second subset of the plurality of allocated frequency blocks. For example, the emphasis controller 130 controls the filter 116 using the BB filter control logic 134 to perform the digital tuning. In an embodiment, a table is used, which is stored for instance in the memory 136, to determine a maximum amount of emphasis to the frequency blocks containing the higher priority data while still satisfying flatness requirements. In such a case, the emphasis controller 130 essentially subverts some of the equalization function in order to emphasize those frequency blocks containing the critical data.

Where the higher priority data is carried within frequency blocks that are located at a distance from the center of the Tx frequency band spectrum, the emphasizing is performed using analog tuning at 218, digital tuning at 216, or a combination of both analog and digital tuning depending, for instance, on how far the frequency blocks (having the priority data) are from the center of the Tx frequency band. This is because the farther away the frequency blocks with the priority data are from the center frequency of the Tx frequency band, the more attenuated this data will be relative to other data in the plurality of allocated frequency blocks. In such a case, it is beneficial to using the analog tuning to increase the transmit power for the frequency blocks containing the higher priority data relative to the transmit power of other frequency blocks in order to obtain a better signal for the critical data. Again, a table stored in the memory 136, for instance, can be used to assist in determining when to use the analog tuning approach. More particularly, the table can be used to determine how "near" the frequency blocks containing the higher priority data should be to the center of the frequency band of operation to perform default analog tuning and how far these frequency blocks should be from the center of the frequency band of operation to perform emphasis using analog tuning.

In the simplex antenna arrangement, the analog tuning comprises tuning the antenna matching network 110 to center an output frequency response, of at least one antenna, e.g., antenna 142, of the electronic device 100, on a center frequency within the first subset of the plurality of allocated frequency blocks, which contain the data having the higher priority instead of on a center frequency of the frequency band of operation. For example, the emphasis controller 130 controls the antenna matching network 110 using the antenna logic 132 to perform the analog tuning at 218. In the duplex antenna arrangement, the emphasis controller 130 using the antenna logic 132 controls the antenna matching network 148 to perform the analog tuning for emphasizing the frequency blocks containing the higher priority data. Upon performing the analog and/or digital tuning during data transmission, the method 200 returns to functional block 202 to re-perform the method 200 while communicating a different set of data, for instance.

Turning again to decision block 206, when it is determined that the data is being received, the emphasis controller 130 determines at 208 whether the higher priority data is carried within frequency blocks that are located at or near the center of the Rx frequency band spectrum. If so, at 210, the emphasis controller 130, using the antenna tuning logic 132, controls the antenna matching network 120 in the simplex antenna arrangement and the antenna matching network 148 in the duplex antenna arrangement to perform default analog tuning, which by default favors the frequency blocks with the higher priority data. The method 200 then returns to block 202.

Conversely, where the higher priority data is carried within frequency blocks that are located at a distance from the center of the Rx frequency band spectrum, the emphasis controller 130, using the antenna tuning logic 132, controls the antenna matching network 120 (or the antenna matching network 148) to perform emphasis using analog tuning, at 212. For instance, the emphasis using analog tuning comprises tuning the antenna matching network 120 (or 148) to center an output frequency response, of at least one antenna, e.g., antenna 144 (or 146), of the electronic device 100, on a center frequency within the first subset of the plurality of allocated frequency blocks, which contain the data having the higher priority. Performing emphasis in the receive front end increases receive sensitivity and signal-to-noise ratio, for instance, of the frequency blocks having the priority data over that of other frequency blocks. Upon performing the analog tuning during data reception, the method 200 returns to functional block 202.

In the embodiment described by reference to method 200, emphasizing is performed using digital tuning while transmitting the data but not while receiving the data. Moreover, the algorithm includes, at times: determining that the first subset of the plurality of allocated frequency blocks, which contain the data having the higher priority, is at or near the center of a frequency band of operation; and responsively performing the emphasizing using only the digital tuning when transmitting the data. However, the example algorithm shown in FIG. 2 does not limit the teachings herein.

For example, in another embodiment, when the higher priority data is carried within frequency blocks that are located at a distance from the center of the Rx frequency band spectrum, emphasis using analog tuning, digital tuning, or a combination of both is also used in the receive path similar as with the transmit path. In a further illustrative implementation, priority data is communicated on both the transmit and receive paths at substantially the same time using the single antenna 146. In this case, emphasis could be performed for both the transmit and receive paths using the different tuning techniques. For example, analog tuning could be used to emphasize the frequency blocks containing the priority receive data; whereas, digital tuning could be used to emphasize the frequency blocks containing the priority transmit data. This technique is especially useful where using the shared antenna matching network 148 to emphasize the frequency blocks with the priority receive data would deemphasize or attenuate the frequency blocks with the priority transmit data. In essence, this deemphasis of attenuation can be compensated using the baseband digital tuning.

Moreover, it was assumed that the electronic device performing method 200 utilized narrowband antennas. However, where the antennas are not narrowband as compared to the frequency band of operation, emphasis can be performed using only digital tuning in the transmit path, in the receive path, or in both.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed in an electronic device, for emphasizing frequency blocks containing priority data, the method comprising:
   determining to communicate data in a plurality of allocated frequency blocks;
   identifying a first subset of the plurality of allocated frequency blocks that contain data having a higher priority than data in a second subset of the plurality of allocated frequency blocks;
   determining a position of the first subset of the plurality of allocated frequency blocks in a frequency band of operation;
   emphasizing, during data communication, the first subset of the plurality of allocated frequency blocks, which contain the data having the higher priority, over the second subset of the plurality of allocated frequency blocks;
   wherein the emphasizing comprises using digital tuning to increase a first amplitude of the first subset of the plurality of frequency blocks relative to a second amplitude of the second subset of the plurality of frequency blocks if the position of the first subset of the plurality of allocated frequency blocks is identified in a table as being in a first range of the frequency band of operation; and
   wherein the emphasizing comprises using analog tuning to increase power of the first subset of the plurality of frequency blocks if the position of the first subset of the plurality of allocated frequency blocks is identified in the table as being in a second range of the frequency band of operation, wherein the first range is closer to a center of the frequency band than the second range.

2. The method of claim 1, wherein the first subset of the plurality of allocated frequency blocks, which contain the data having the higher priority, is emphasized during a transmission of the data.

3. The method of claim 2, wherein the first subset of the plurality of allocated frequency blocks, which contain the data having the higher priority, is emphasized during an uplink transmission of the data to a base station.

4. The method of claim 1, wherein the first subset of the plurality of allocated frequency blocks, which contain the data having the higher priority, is emphasized during a reception of the data.

5. The method of claim 1, wherein the plurality of allocated frequency blocks comprises a plurality of Orthogonal Frequency-Division Multiple Access resource blocks.

6. The method of claim 1, wherein the data having the higher priority comprises control data.

7. The method of claim 1, wherein the data having the higher priority comprises higher priority application data.

8. The method of claim 7, wherein the higher priority application data comprises voice data.

9. The method of claim 1, wherein the analog tuning comprises tuning components of an antenna matching network coupled to at least one antenna of the electronic device to center an output frequency response of the at least one antenna on a center frequency within the first subset of the plurality of allocated frequency blocks, which contain the data having the higher priority.

10. The method of claim 1, wherein the emphasizing is performed using digital tuning while transmitting the data but not while receiving the data.

11. An electronic device configured for emphasizing frequency blocks containing priority data, the electronic device comprising:
   a processor configured to:
      determine that data is scheduled for communication in a plurality of allocated frequency blocks;
      identify a first subset of the plurality of allocated frequency blocks that contain data having a higher priority than data in a second subset of the plurality of allocated frequency blocks;
      determine a position of the first subset of the plurality of allocated frequency blocks in a frequency band of operation;
      emphasize the first subset of the plurality of allocated frequency blocks, which contain the data having the higher priority, over the second subset of the plurality of allocated frequency blocks;
      wherein the emphasizing comprises using digital tuning to increase a first amplitude of the first subset of the plurality of frequency blocks relative to a second amplitude of the second subset of the plurality of frequency blocks if the position of the first subset of the plurality of allocated frequency blocks is identified in a table as being in a first range of the frequency band of operation; and
      wherein the emphasizing comprises using analog tuning to increase power of the first subset of the plurality of frequency blocks if the position of the first subset of the plurality of allocated frequency blocks is identified in the table as being in a second range of the frequency band of operation, wherein the first range is closer to a center of the frequency band than the second range; and at least one antenna coupled to the processor and configured to communicate the data.

12. The electronic device of claim 11 further comprising a baseband integrated circuit having a filter coupled to the processor, wherein the processor is configured to control the filter to increase an amplitude of the first subset of the plurality of allocated frequency blocks, which contain the data having the higher priority, relative to an amplitude of the second subset of the plurality of allocated frequency blocks.

13. The electronic device of claim 11 further comprising a transceiver front end having an antenna matching network coupled between the processor and the at least one antenna, wherein the processor is configured to tune the antenna matching network to center an output frequency response, of the at least one antenna, on a center frequency within the first subset of the plurality of allocated frequency blocks, which contain the data having the higher priority.

14. The electronic device of claim 13, wherein the antenna matching network is included in at least one of a transmit path or a receive path.

15. A method, performed in an electronic device, for emphasizing resource blocks containing priority data, the method comprising:

determining to communicate data in a plurality of allocated Orthogonal Frequency-Division Multiple Access resource blocks;

identifying a first subset of the plurality of allocated resource blocks that contain data having a higher priority than data in a second subset of the plurality of allocated resource blocks;

determining a position of the first subset of the plurality of allocated frequency blocks in a frequency band of operation;

emphasizing, during data communication, the first subset of the plurality of allocated resource blocks, which contain the data having the higher priority, over the second subset of the plurality of allocated resource blocks;

wherein the emphasizing comprises using digital tuning to increase a first amplitude of the first subset of the plurality of frequency blocks relative to a second amplitude of the second subset of the plurality of frequency blocks if the position of the first subset of the plurality of allocated frequency blocks is identified in a table as being in a first range of the frequency band of operation; and wherein the emphasizing comprises using analog tuning to increase power of the first subset of the plurality of frequency blocks if the position of the first subset of the plurality of allocated frequency blocks is identified in the table as being in a second range of the frequency band of operation, wherein the first range is closer to a center of the frequency band than the second range.

16. The method of claim 15 wherein the emphasizing comprises at least one of:

adjusting a baseband filter to increase an amplitude of the first subset of the plurality of allocated frequency blocks, which contain the data having the higher priority, relative to an amplitude of the second subset of the plurality of allocated frequency blocks; or tuning an antenna matching network to center an output frequency response, of at least one antenna of the electronic device, on a center frequency within the first subset of the plurality of allocated frequency blocks, which contain the data having the higher priority.

* * * * *